US009270222B2

(12) United States Patent
Yoo

(10) Patent No.: US 9,270,222 B2
(45) Date of Patent: Feb. 23, 2016

(54) MULTI-LEVEL MEDIUM-VOLTAGE INVERTER

(71) Applicant: LSIS CO., LTD., Anyang-si, Gyeonggi-do (KR)

(72) Inventor: Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/314,888

(22) Filed: Jun. 25, 2014

(65) Prior Publication Data

US 2015/0008856 A1    Jan. 8, 2015

(30) Foreign Application Priority Data

Jul. 2, 2013   (KR) ........................ 10-2013-0076943

(51) Int. Cl.
  *H02P 27/04*    (2006.01)
  *H02P 27/06*    (2006.01)
  *H02M 7/487*    (2007.01)
  *H02M 7/49*     (2007.01)

(52) U.S. Cl.
  CPC ............... *H02P 27/06* (2013.01); *H02M 7/487* (2013.01); *H02M 7/49* (2013.01)

(58) Field of Classification Search
  CPC ........... H02M 5/42; H02M 7/487; H02J 1/12; H01L 29/7393
  USPC .......... 318/800, 801, 727; 363/34, 35, 37, 65, 363/71
  See application file for complete search history.

(56) References Cited

U.S. PATENT DOCUMENTS

| 7,830,681 B2* | 11/2010 | Abolhassani et al. ........... 363/37 |
| 8,045,346 B2* | 10/2011 | Abolhassani et al. ........... 363/37 |
| 8,213,198 B2* | 7/2012 | Abolhassani et al. ........... 363/65 |
| 8,223,515 B2* | 7/2012 | Abolhassani et al. ........... 363/65 |
| 8,279,640 B2* | 10/2012 | Abolhassani et al. ........... 363/37 |
| 8,711,530 B2* | 4/2014 | Ledezma et al. ................ 361/42 |
| 8,847,328 B1* | 9/2014 | Laschek-Enders . H01L 27/0647 257/401 |
| 2010/0072824 A1 | 3/2010 | Abolhassani et al. |

FOREIGN PATENT DOCUMENTS

| EP | 2575249 | 4/2013 |
| JP | 2010-252450 | 11/2010 |

(Continued)

OTHER PUBLICATIONS

European Patent Office Serial No. 14174661.0, Search Report dated Mar. 9, 2015, 6 pages.

(Continued)

*Primary Examiner* — Antony M Paul
(74) *Attorney, Agent, or Firm* — Lee, Hong, Degerman, Kang & Waimey

(57) ABSTRACT

A multi-level medium-voltage inverter that receives three-phase power and outputs a three-phase voltage to a three-phase motor, includes: a plurality of unit power cells connected in series to output a single phase voltage, individual unit power cells each having a phase voltage forming a single level to configure multiple levels; and a module-type phase shift transformer configured to convert the three-phase power and applying the converted power to three unit power cells constituting one level, wherein the module-type phase shift transformer includes a plurality of modules.

2 Claims, 17 Drawing Sheets

(56) References Cited

FOREIGN PATENT DOCUMENTS

| | | |
|---|---|---|
| JP | 2011-223734 | 11/2011 |
| JP | 2013-074789 | 4/2013 |

OTHER PUBLICATIONS

Japan Patent Office Application Serial No. 2014-136607, Office Action dated Jun. 16, 2015, 4 pages.

* cited by examiner

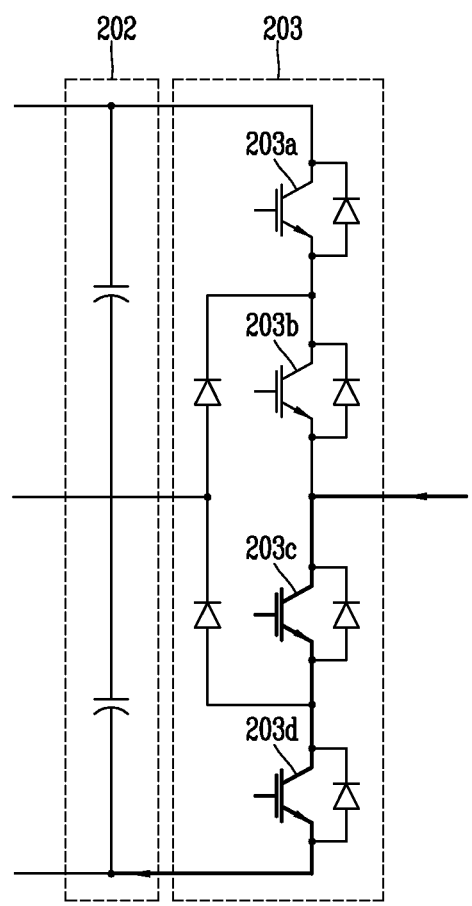

MULTI-LEVEL MEDIUM-VOLTAGE INVERTER

CROSS-REFERENCE TO RELATED APPLICATION

Pursuant to 35 U.S.C. §119(a), this application claims the benefit of earlier filing date and right of priority to Korean Application No. 10-2013-0076943, filed on Jul. 2, 2013, the contents of which are all incorporated by reference herein in its entirety.

BACKGROUND OF THE INVENTION

1. Field of the Invention

The present disclosure relates to a multi-level medium-voltage inverter.

2. Background of the Invention

A multi-level medium-voltage inverter is an inverter in which an effective value of an input line-to-line voltage has input power of 600V or higher, and an output phase voltage thereof has multiple stages (or multiple levels). A medium-voltage inverter is generally used to drive a motor having large capacity ranging from hundreds of kW to tens of MW, and mainly used in the fields such as fans, pumps, compressors, traction, hoist, conveyor, and the like.

A general voltage-type medium-voltage inverter uses a cascaded H-bridge inverter or a cascaded neutral point clamped (NPC) inverter as a modified inverter of the cascaded H-bridge inverter. The cascaded NPC inverters have emerged with its small volume, relative to existing cascaded H-bridge inverters.

Multi-level medium-voltage inverters applied to various fields are required to include smaller elements and have higher efficiency.

SUMMARY OF THE INVENTION

Therefore, an aspect of the detailed description is to provide a multi-level medium-voltage inverter in which a unit power cell is configured as a cascaded T-type neutral point clamped (NPC) inverter to reduce conduction loss, so as to be advantageously designed for heat dissipation, a smaller number of power semiconductor elements are required.

To achieve these and other advantages and in accordance with the purpose of this specification, as embodied and broadly described herein, a multi-level medium-voltage inverter that receives three-phase power and outputs a three-phase voltage to a three-phase motor, may include: a plurality of unit power cells connected in series to output a single phase voltage, individual unit power cells each having a phase voltage forming a single level to configure multiple levels; and a module-type phase shift transformer configured to convert the three-phase power and applying the converted power to three unit power cells constituting one level, wherein the module-type phase shift transformer includes a plurality of modules.

The number of modules of the phase shift transformer may correspond to the number of multiple levels.

In the module-type phase shift transformer, a phase shift angle of a primary winding may be determined by using the number of the module-type phase shift transformers the number of outputs of a secondary side of the module-type phase shift transformer, and the number of pulses of a rectifying unit of the unit power cell.

The unit power cell may include the rectifying unit configured to receive an output from the module-type phase shift transformer and rectify the same; a smoothing unit configured to smooth a DC voltage rectified by the rectifying unit; and an inverter unit in which a plurality of switch units including a diode and a power semiconductor connected in parallel are configured in a cascaded T-type neutral point clamped (NPC) manner.

To achieve these and other advantages and in accordance with the purpose of this specification, as embodied and broadly described herein, a medium-voltage inverter that receives three-phase power and outputs a three-phase voltage to a three-phase motor, may include: three-phase unit power cells configured to output a single phase voltage; and a module-type phase shift transformer configured to convert the three-phase power and applying the same to one of the three-phase unit power cells, wherein the module-type phase shift transformer is configured to correspond to the number of the unit power cells.

In the module-type phase shift transformer, a phase shift angle of a primary winding may be determined by using the number of the module-type phase shift transformers the number of outputs of a secondary side of the module-type phase shift transformer, and the number of pulses of a rectifying unit of the unit power cell.

The unit power cell may include the rectifying unit configured to receive an output from the module-type phase shift transformer and rectify the same; a smoothing unit configured to smooth a DC voltage rectified by the rectifying unit; and an inverter unit in which a plurality of switch units including a diode and a power semiconductor connected in parallel are configured in a cascaded T-type neutral point clamped (NPC) manner.

According to the exemplary embodiment of the present disclosure, the structure of the phase shift transformer used in the input terminal of the multi-level medium-voltage inverter is modularized to increase a degree of freedom in designing a system, thereby reducing a volume and weight of the overall system, and accordingly, redundancy of the overall system may be increased.

Also, according to the exemplary embodiment of the present disclosure, since the inverter unit is configured to have the cascaded T-type NPC structure to reduce the number of conducted power semiconductors on average, conduction loss may be reduced, facilitating a design of heat dissipation, and thus, a volume and costs of the overall system may be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 3A through 3F are views illustrating examples of operations of an inverter unit of FIG. 2.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

The related art multi-level medium-voltage inverter will be described and exemplary embodiments of the present disclosure will be described in detail with reference to the accompanying drawings.

Figure 1:
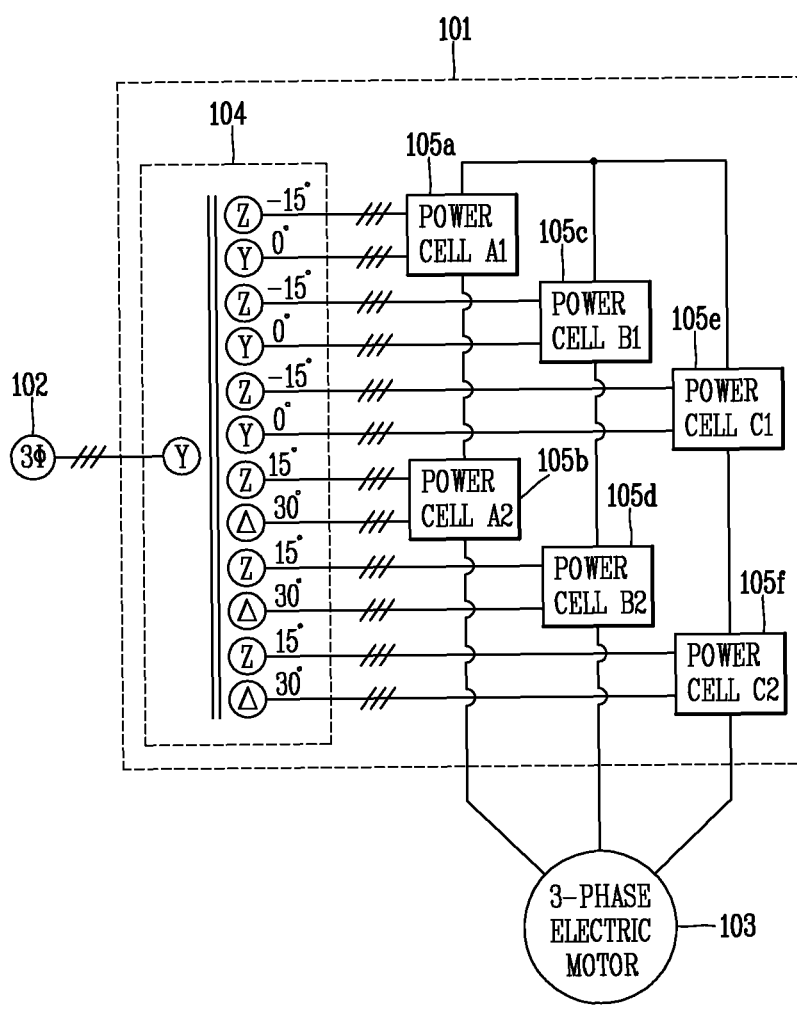
FIG. 1 a block diagram illustrating a configuration of a related art multi-level medium-voltage inverter.
Figure 2:
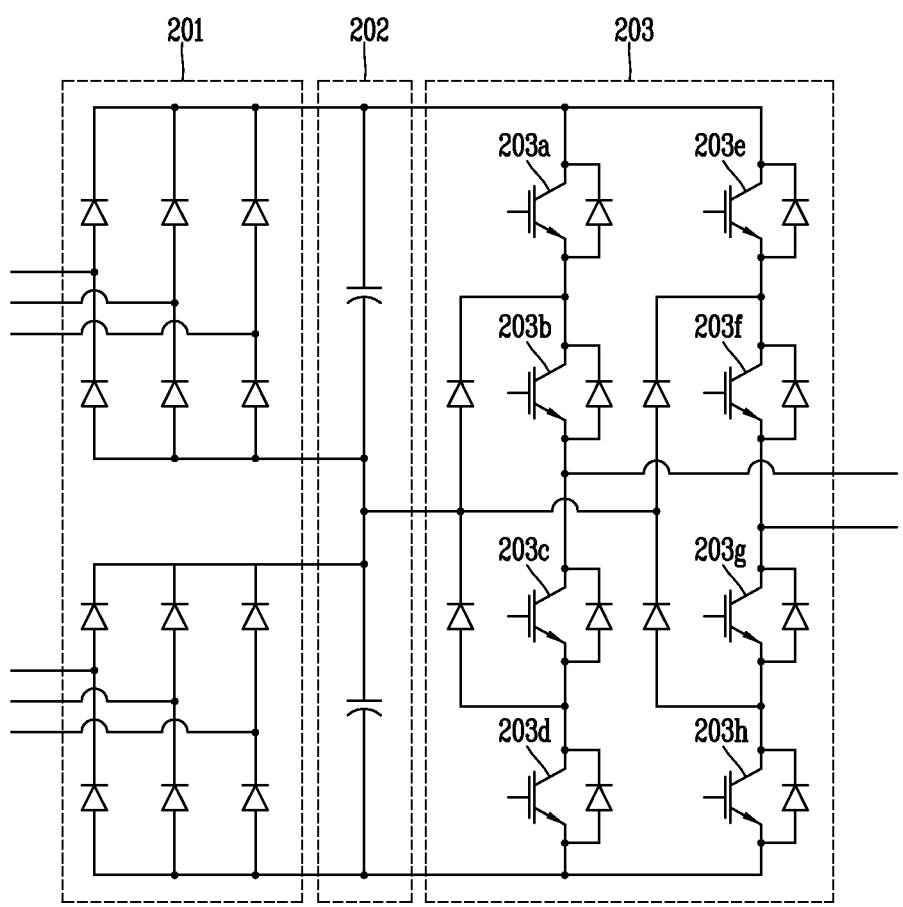
FIG. 2 is a view illustrating a configuration of each unit power cell of FIG. 1.

FIG. 1 a block diagram illustrating a configuration of a related art multi-level medium-voltage inverter, and FIG. 2 is a view illustrating a configuration of each unit power cell of FIG. 1.

As illustrated in FIGS. 1 and 2, the related art medium-voltage inverter includes an input three-phase power source 102, a three-phase motor 103, a phase shift transformer 104, and unit power cells 105a to 105f.

The input three-phase power source 102 supplies a line-to-line voltage root mean square equal to or higher than 600V. The three-phase motor 103 is a load of the inverter system. A primary winding of the phase shift transformer 104 has a three-phase Y connection form, and a total of twelve secondary windings including three windings having a phase difference of −15 degrees, three windings having a phase difference of 0 degree, three windings having a phase difference of 15 degrees, and three windings having a phase difference of 30 degrees with respect to the primary winding. The structure of the secondary windings may be determined according to the number of unit power cells 105a to 105f.

A magnitude of an output voltage of each of the unit power cells 105a to 105f has five levels. Two unit power cells are provided per phase of the motor 103 operated as a load, and the number of unit power cells may be increased as needed. The unit power cells 105a and 150b are connected in series to output an a-phase voltage to the three-phase motor as a load, the unit power cells 105c and 105d output a b-phase voltage, and the unit power cells 105e and 105f output a c-phase voltage. The unit power cells 105a, 105c, and 105e receive outputs having phases of −15 degrees and 0 degree among outputs of the phase shift transformer 104, and the unit power cells 105b, 105d, and 105f receive outputs having phases of 15 degrees and 30 degrees among the outputs of the phase shift transformer 104.

Referring to FIG. 2, a unit power cell includes a diode rectifying unit 201, a smoothing unit 202, and an inverter unit 203 synthesizing output voltages. The diode rectifying unit 201 receives two three-phase powers, and the input powers are output from the phase shift transformer 104 illustrated in FIG. 1. An output from the diode rectifying unit 201 is delivered to two DC-link capacitors connected in series, and the two DC-link capacitors have the same capacitance. The inverter unit 203 serves to synthesize an output from the diode rectifying unit 201, and an output line-to-line voltage has 5 levels.

Four switch units 203a, 203b, 203c and 204d are connected in series to a leg of the inverter unit 203, and an output voltage is defined according to operations of the switch units.

Operations of the switch units 203a and 203c are complementary, and switching operations of the switch units 203b and 203d are also complementary. Thus, in a case in which a capacitor voltage of the smoothing unit 202 connected in series is defined as E (volt), respectively, when the switch units 203a and 203b are turned on, the switch units 203c and 204d are turned off, at this time a pole voltage E is output.

Also, when the switch units 203a and 203c are turned on, the switch units 203b and 203d are turned off, and at this time, an output pole voltage is 0. Similarly, in a state in which the switch units 203a and 203b are turned off, the switch units 203c and 203d are turned on, and in this case, a pole voltage −E is output.

Using output pole voltages defined in this manner, an output line-to-line voltage may have five stages (or levels) of 2E, E, 0, −E, and −2E. Since an output line-to-line voltage of each cell is defined as having 5 levels, a voltage that may be synthesized by the unit power cells 105a and 105b of FIG. 1 may have nine levels of 4E, 3E, 2E, E, 0, −E, −2E, −3E, and −4E, and a line-to-line voltage output to the load motor 103 may have 17 levels of 8E, 7E, 6E, 5E, 4E, 3E, 2E, E, 0, −E, −2E, −3E, −4E, −5E, −6E, −7E, and −8E.

FIGS. 3A through 3F are views illustrating examples of operations of an inverter unit of FIG. 2, in which conduction of a power semiconductor according to directions of currents when output pole voltages are determined as E, 0, −E, is illustrated.

Figure 3A:
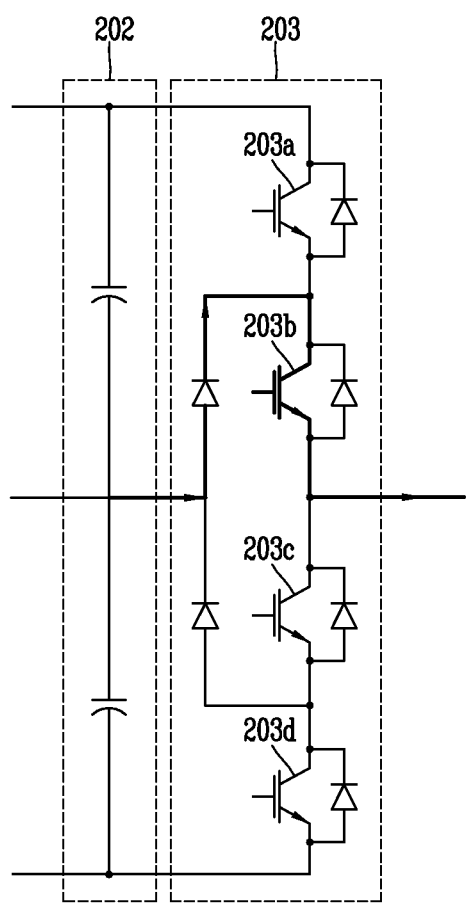
Figure 3B:
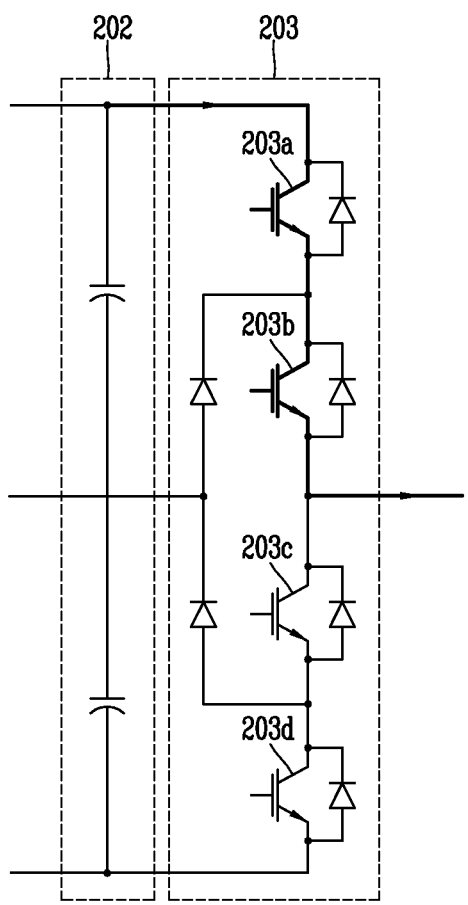
Figure 3C:
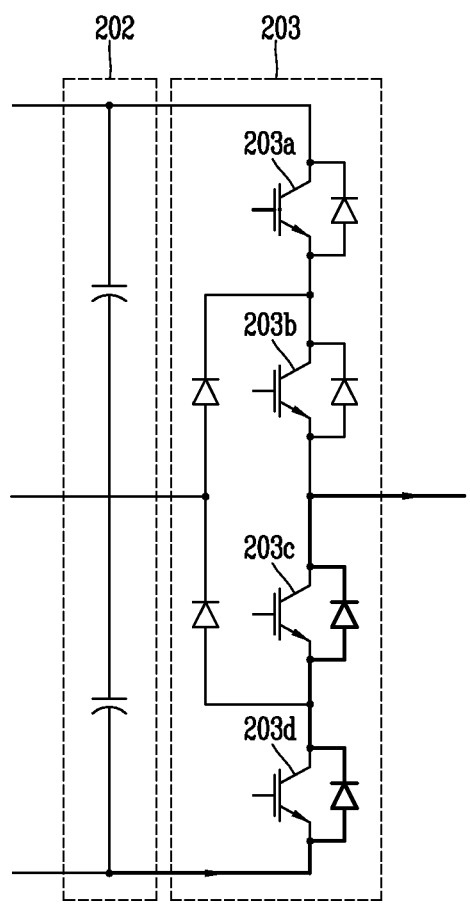

In FIG. 3A, a diode and a switch unit 203b are conducted, an output current flows in a positive direction, and a pole voltage 0 is output. Here, one diode and one switch unit are conducted. In FIG. 3B, switch units 203a and 203b are conducted, an output current flows in a positive direction, and a pole voltage E is output. Here, two switch units are conducted. In FIG. 3C, two diodes are conducted, an output current flows in a positive direction, and a pole voltage −E is output. Here, two diodes are conducted.

Figure 3D:
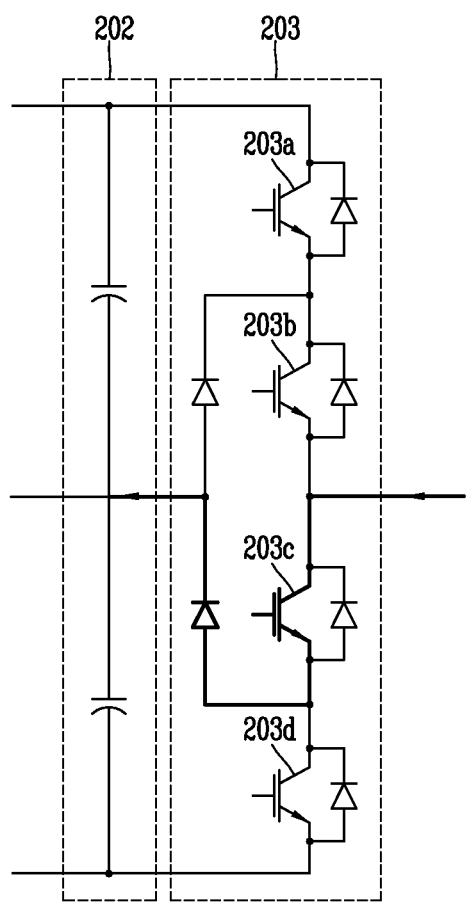
Figure 3E:
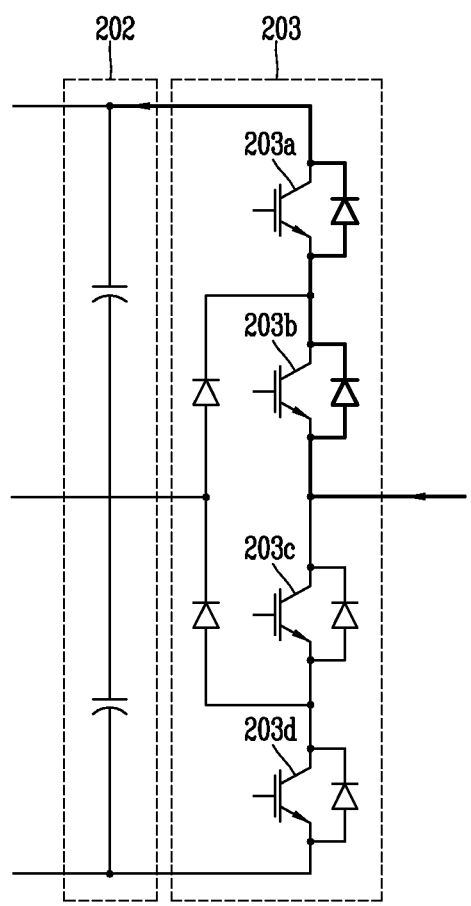

In FIG. 3D, a diode and a switch unit 203c are conducted, an output current flows in a negative direction, and a pole voltage 0 is output. In FIG. 3E, two diodes are conducted, an output current flows in a negative direction, and a pole voltage E is output. In FIG. 3F, two switch units 203c and 203d are conducted, an output current flows in a negative direction, and a pole voltage −E is output An operation of the phase shift transformer 104 of FIG. 1 will be described.

The phase shift transformer 104 applies three-phase power having electrical insulation to each unit power cell from the input three-phase power source 102. In this case, a primary winding of the phase shift transformer 104 is a Y-connection or a delta connection, and the secondary winding outputs phase-shifted power with respect to the primary winding. In this case, the secondary winding outputs an appropriate magnitude of voltage that meets demand of each unit power cell.

The secondary side outputs of the phase shift transformer 104 are equal to the number of the diode rectifying units 201 of each unit power cell, and have the following relationship.

$$N_{sec} = 3 N_{unit} N_{diode} \quad \text{[Equation 1]}$$

Here, Nsec is the number of secondary side outputs of the phase shift transformer 104, Nunit is the number of unit power cells connected to each phase of the load motor 103, and Ndiode is the number of diode rectifying units 201 installed in a single unit power cell.

For example, in the structure of FIG. 1, Nunit is 2 and Ndiode, and thus, Nsec is 12.

A phase shift angle of the secondary windings of the phase shift transformer 104 may be obtained from the following relationship.

$$\alpha_{sec} = \frac{360}{2 N_{sec}} \text{[degree]} \quad \text{[Equation 2]}$$

Here, $\alpha_{sec}$ is a phase shift angle between the secondary windings. For example, as illustrated in FIG. 1, when Nsec is 12, the phase shift angle between secondary windings is 15 degrees. Based on the determined phase shift angle between the secondary windings, a phase of an output voltage of each secondary winding is changed by the phase shift angle with respect to a primary side input source voltage.

The phase shift transformer of the input terminal of the related art multi-level medium-voltage inverter is configured as a single unit having a structure in which the primary winding includes only a single three-phase power source and the secondary windings connected to unit power cells are output from one transformer.

In the phase shift transformer having a single unit structure, since a requested output should be satisfied in a single transformer, the volume and weight of the transformer itself are increased and there is no degree of freedom in designing, and thus, a volume of the overall system is increased. In addition, when a problem arises in the primary or secondary winding of the transformer, the overall system cannot be operated.

Also, in the related art unit power cell, the inverter unit includes four diodes and eight active switches, and since when a voltage is synthesized, two power semiconductors are constantly conducted, making relative great loss of the inverter unit.

In the present exemplary embodiment, the structure of the phase shift transformer of the multi-level medium voltage inverter configured as a single unit is modularized to provide a degree of freedom of design and reduce a volume and weight of the overall system. Also, since the modularized phase shift transformer is used, although one transformer module has an error, the load motor may be continuously operated in a state in which an output is reduced.

Also, the present exemplary embodiment proposes a cascaded T-type NPC inverter capable of reducing conduction loss, compared to the related art unit power cell.

Figure 4:
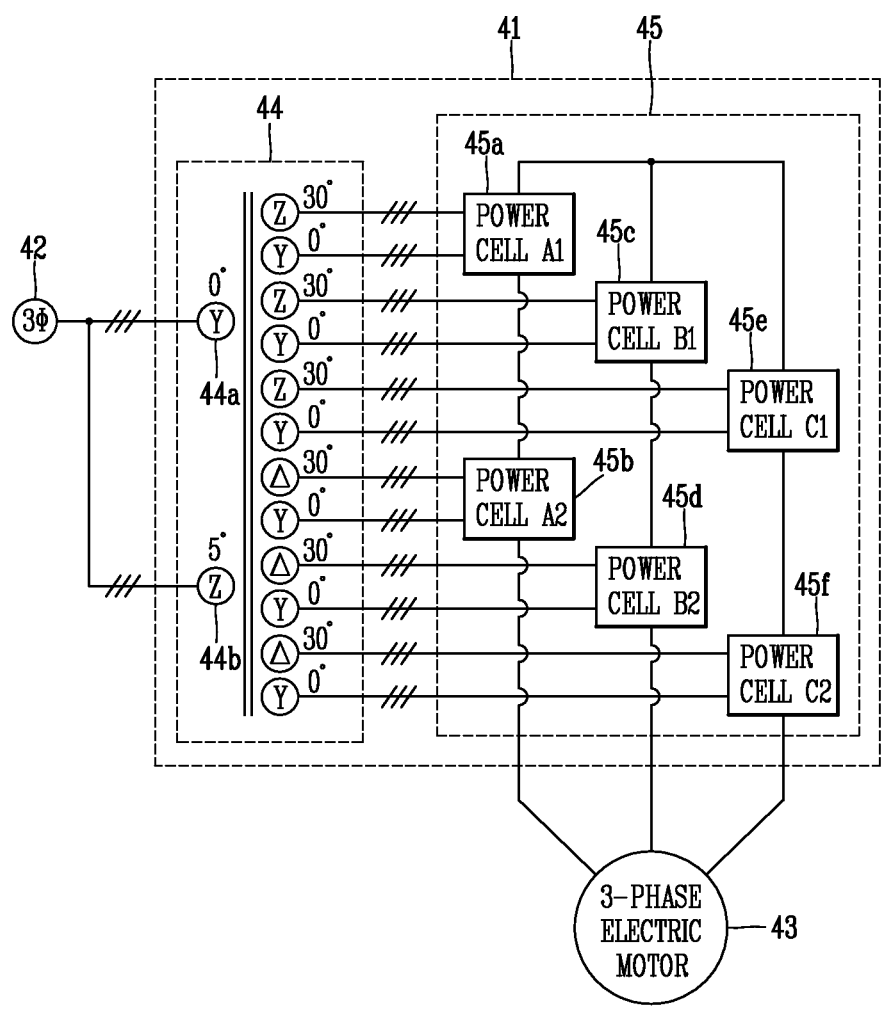
FIG. 4 is a view illustrating a configuration of a multi-level medium-voltage inverter according to a first exemplary embodiment of the present disclosure.

FIG. 4 is a view illustrating a configuration of a multi-level medium-voltage inverter according to a first exemplary embodiment of the present disclosure, in which a line-to-line voltage having a root mean square of 600V or higher is received from a three-phase power source 42 and a three-phase voltage is output to a three-phase motor 43.

As illustrated, a multi-level medium-voltage inverter 41 according to the present exemplary embodiment includes a plurality of unit power cells 45 and a phase shift transformer 44. In the present exemplary embodiment, an example in which 2-level unit power cells are disposed per phase will be described, but the number of unit power cells is not limited thereto.

In the present exemplary embodiment, the phase shift transformer 44 includes two modules 44a and 44b. However, since the unit power cell has 2-level, the phase shift transformer 44 includes two modules, and the number of modules is determined by the level of the unit power cell.

In the first module 44a, a primary winding includes a 3-phase Y connection and secondary windings include a Y connection and a delta (Δ) connection, so phases are shifted by 0 and 30 degrees. In the second module 44b, a primary winding includes a phase-shifted Z connection and secondary windings have the same structure as that of the first module 44a. In the phase shift transformer 44, phases of the primary winding and the secondary windings may be changed according to the number of the secondary windings.

Output voltages of the unit power cell 45 may have 5 levels. In a first exemplary embodiment of the present disclosure, two unit power cells are configured per phase of the load motor 43, and if necessary, the number of unit power cells may be increased as described above.

Outputs of the first and second unit power cells 45a and 45b are connected in series to output an a-phase voltage of the load three-phase motor 43. Third and fourth unit power cells 45c and 45d may output a b-phase voltage, and the fifth and sixth unit power cells 45e and 45f may output a c-phase voltage.

The first, third, and fifth unit power cells 45a, 45c, and 45e may be connected to an output of the first module 44a, and the second, fourth, and sixth unit power cells 45b, 45d, and 45f may be connected to an output of the second module 44b.

Figure 5:
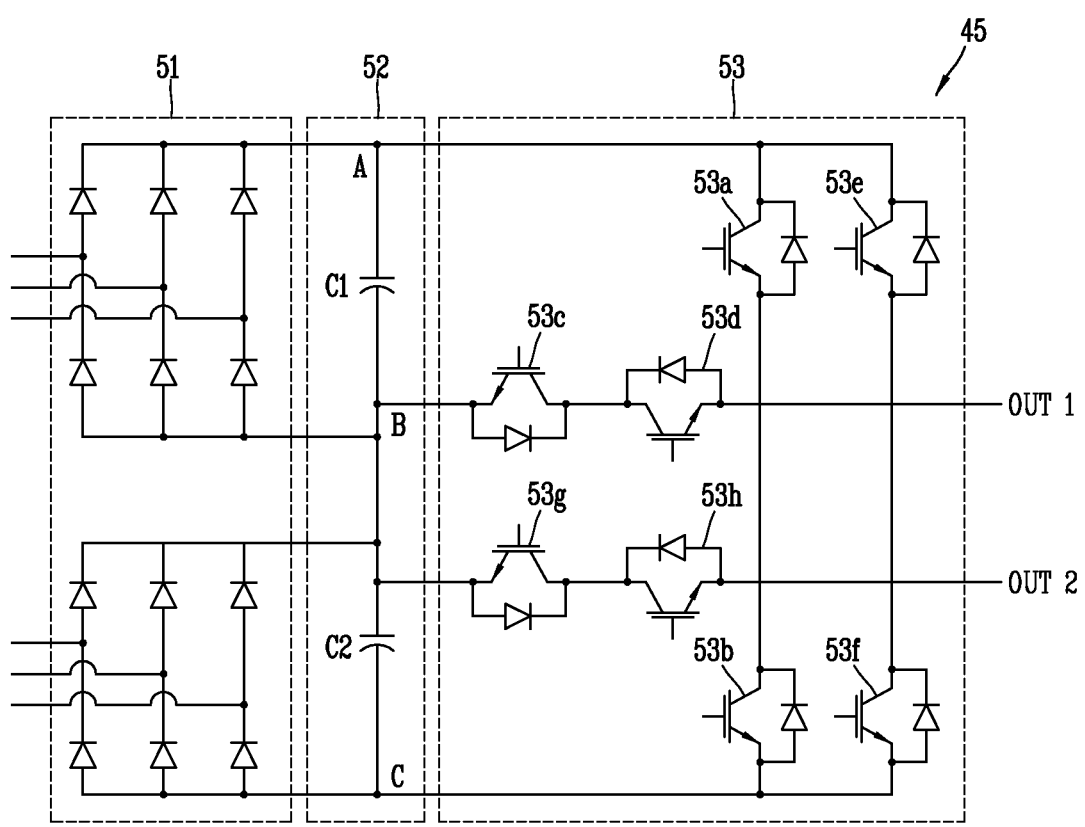
FIG. 5 is a view illustrating a detailed configuration of a unit power cell of FIG. 4.

FIG. 5 is a view illustrating a detailed configuration of the unit power cell of FIG. 4, and since first to sixth unit power cells have the same configuration, "unit power cell 45" will be generally used hereinafter.

As illustrated, the unit power cell 45 of the present disclosure includes a rectifying unit 51, a smoothing unit 52, and an inverter unit 53.

The rectifying unit 51 includes two three-phase diode rectifiers and receives a three-phase voltage from the secondary winding of the first module 44a of the phase shift transformer 44.

The smoothing unit 52 includes two capacitors C1 and C2 which may be connected to the two three-phase diode rectifiers in a series/parallel manner.

The inverter unit 53 may be a cascaded T-type NPC inverter. The inverter unit 53 may include first to eighth switch units 53a to 53h, and each of the switch units may include a diode and a power semiconductor connected in parallel.

The first to fourth switch units 53a to 53d may configure one leg, and the fifth to eighth switch units 53e to 53h may configure another leg, and an output voltage may be synthesized by a potential difference between the two legs.

Figure 6:
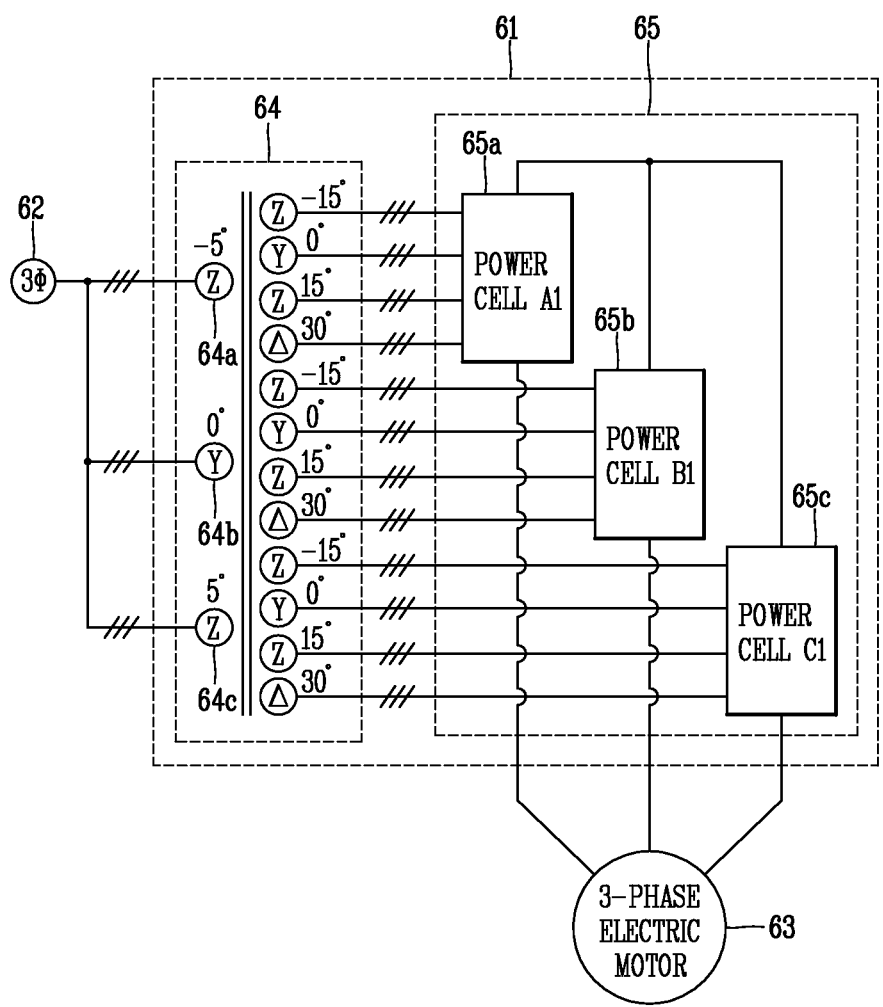
FIG. 6 is a view illustrating a configuration of a multi-level medium-voltage inverter according to a second exemplary embodiment of the present disclosure.

FIG. 6 is a view illustrating a configuration of a multi-level medium-voltage inverter according to a second exemplary embodiment of the present disclosure.

As illustrated in FIG. 6, a multi-level medium-voltage inverter 61 according to the second exemplary embodiment of the present disclosure includes a phase shift transformer 64 and a unit power cell 65.

In the second exemplary embodiment of the present disclosure, the phase shift transformer 64 includes three modules 64a to 64c. A primary winding of a first module 64a includes a Z connection having a phase of −5 degrees, and secondary windings thereof are configured as windings having phases of −15, 0, 15, and 30 degrees.

A primary winding of a second module 64b includes a Y connection having a phase of 0 degree, and secondary windings thereof are configured to be the same as those of the first module 64a. Also, a primary winding of a third module 64c includes a Z connection having a phase of 5 degrees, and secondary windings thereof are configured to be the same as those of the first module 64a.

Figure 7:
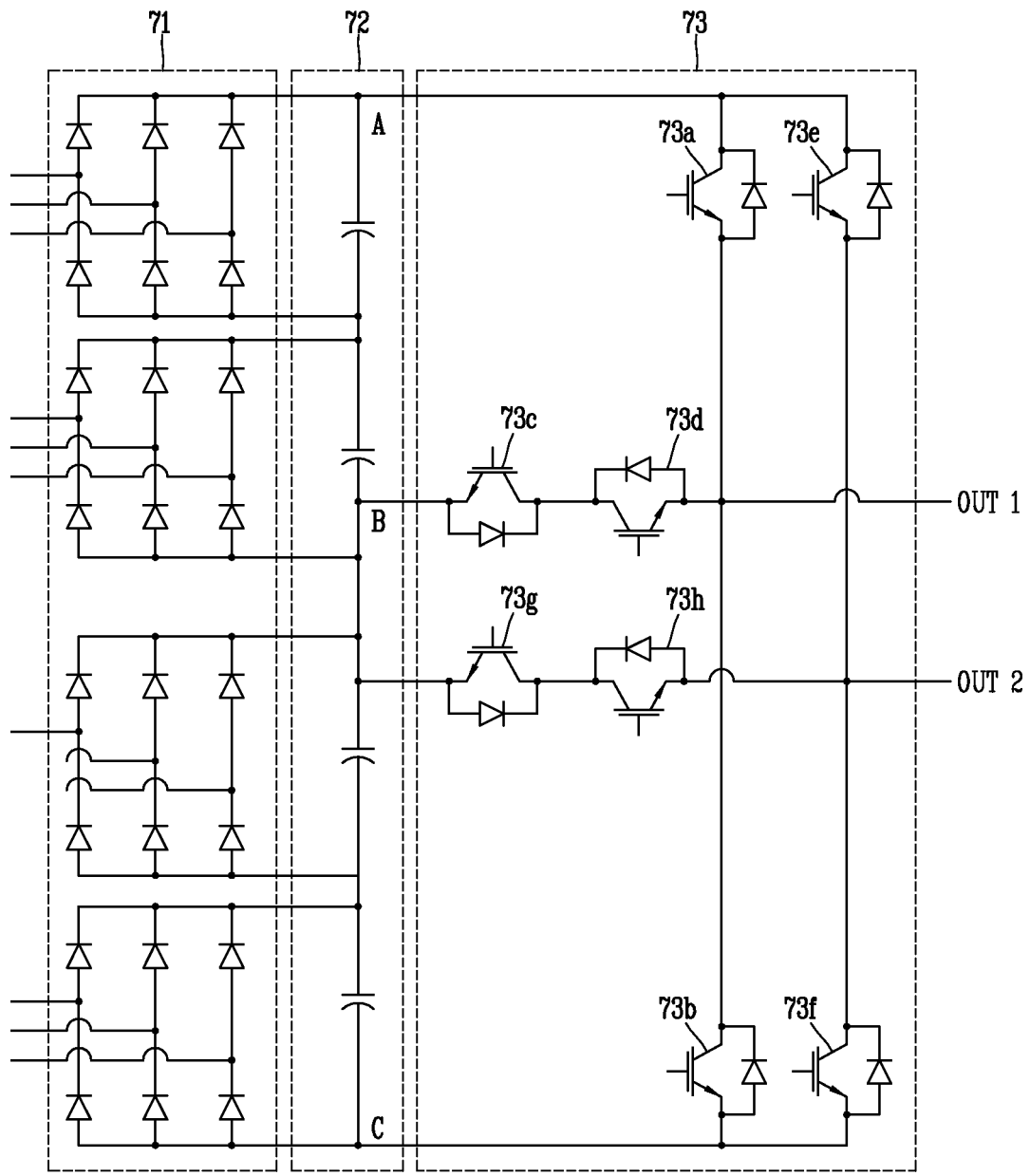
FIG. 7 is a view illustrating a detailed configuration of a unit power cell of FIG. 6.

Each unit power cell 65 may synthesize an output voltage of 5 levels. FIG. 7 is a view illustrating a detailed configuration of a unit power cell of FIG. 6. The configuration of a unit power cell 73 of FIG. 7 is merely different in the number of the components of a rectifying unit 71 and a smoothing unit 73 from the configuration of the unit power cell 45 of FIG. 5, so a detailed description thereof will be omitted.

Figure 8:
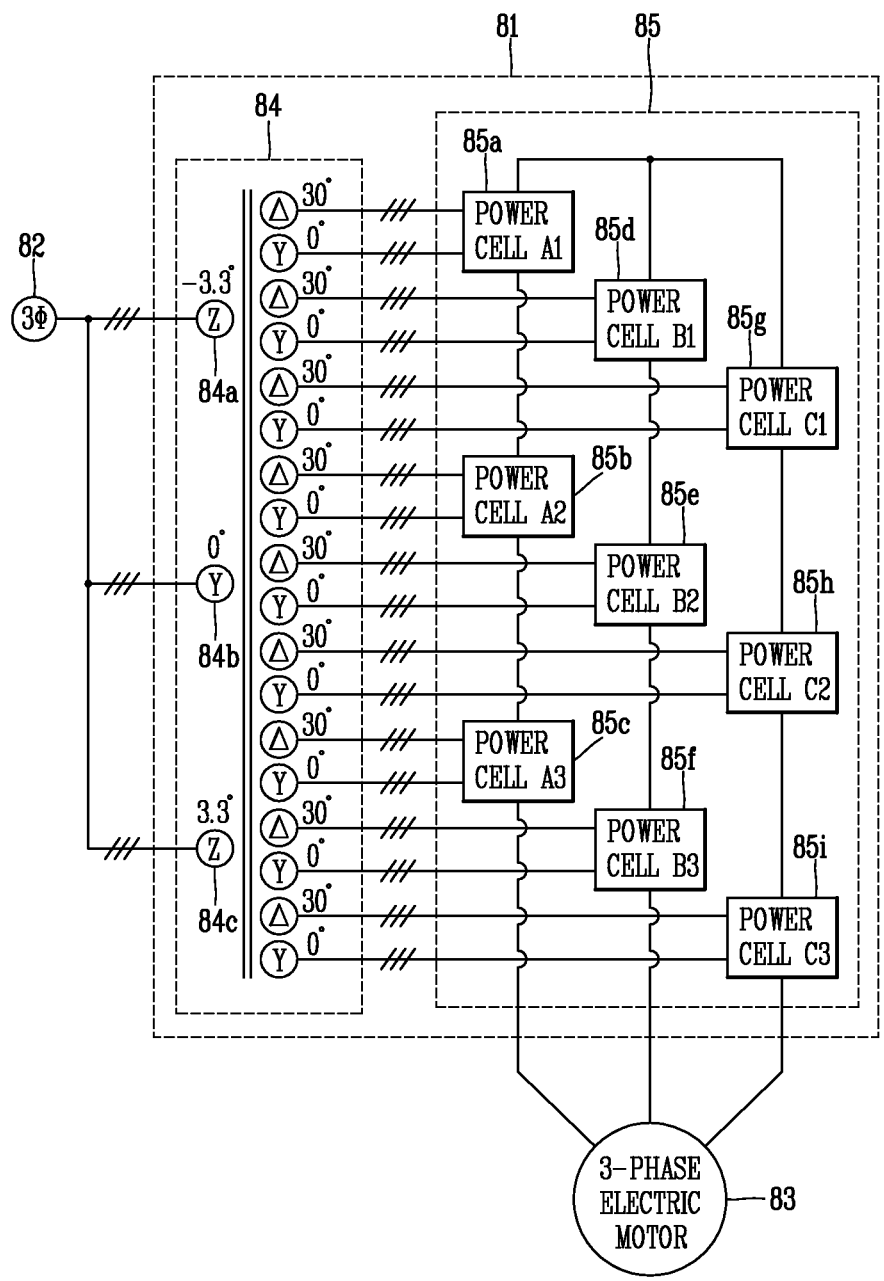
FIG. 8 is a view illustrating a configuration of a multi-level medium-voltage inverter according to a third exemplary embodiment of the present disclosure.
Figure 9:
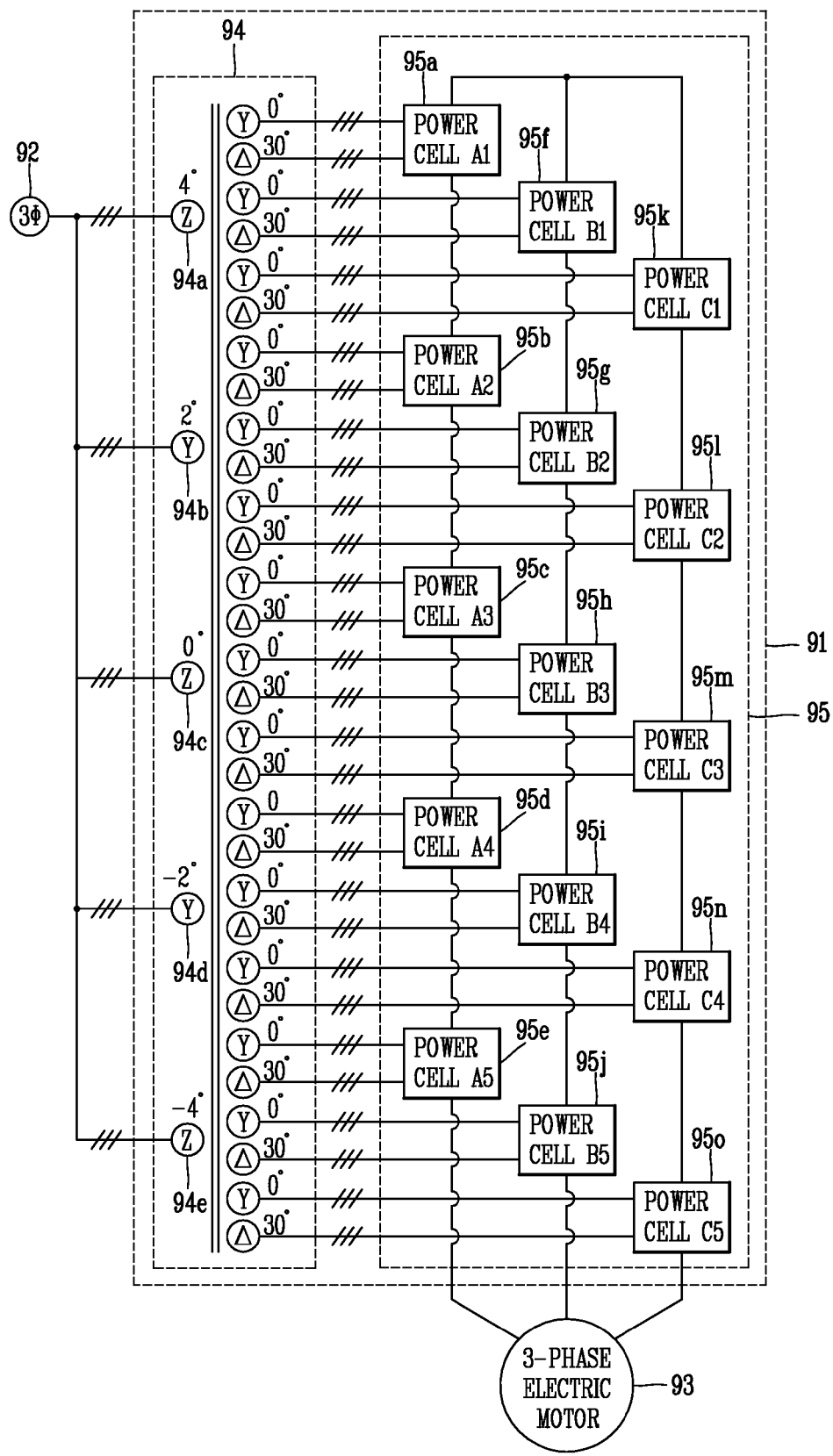
FIG. 9 is a view illustrating a configuration of a multi-level medium-voltage inverter according to a fourth exemplary embodiment of the present disclosure.

FIG. 8 is a view illustrating a configuration of a multi-level medium-voltage inverter according to a third exemplary embodiment of the present disclosure. FIG. 9 is a view illustrating a configuration of a multi-level medium-voltage inverter according to a fourth exemplary embodiment of the present disclosure. FIG. 8 illustrates an example in which three unit power cells are included per phase of output, and FIG. 9 illustrates an example in which five unit power cells are included per phase of output.

In FIG. 8, a phase shift transformer 84 includes first to third modules 84a to 84c, and a primary winding of the first module 84a includes a three-phase Z connection having a phase of −3.3 degrees, and secondary windings thereof include winding having phase differences of 0 and 30 degrees.

A primary winding of the second module 84b includes a three-phase Y connection having a phase of 0 degree, and secondary windings thereof is configured to be the same as those of the first module 84a. Also, a primary winding of the third module 84c includes a three-phase Z connection having a phase of −3.3 degrees, and secondary windings thereof are configured to be the same as that of the first module 84a.

The unit power cell 84 of the third exemplary embodiment of FIG. 8 may be configured to be the same as that of FIG. 6, so a detailed description thereof will be omitted.

Meanwhile, referring to FIG. 9, in a medium-voltage inverter of the fourth exemplary embodiment of the present disclosure, a phase shift transformer 94 includes five modules.

A primary winding of a first module 94a includes a three-phase Z connection having a phase of −4 degrees, and secondary windings thereof include Y and Δ connections having phase differences of 0 and 30 degrees. Secondary windings of the second to fourth modules 94b to 94e are the same as those of the first module 94a.

A primary winding of a second module 94b may include a Z connection having a phase of −2 degrees. A primary winding of a third module 94c may be configured as a Y connection having a phase of 0 degree. A primary winding of a fourth module 94d may include a Z connection having a phase of −2 degrees. A primary winding of a fifth module 94e may include a Z connection having a phase of −4 degrees.

The power unit cell 95 of the fourth exemplary embodiment of FIG. 9 may be configured in the same manner as that of FIG. 5, so a detailed description thereof will be omitted.

In this manner, the present disclosure modularizes the phase shift transformer of a single unit of the related art. The single modularized phase shift transformer may provide a three-phase voltage to a unit power cell (namely, three unit power cells) (exemplary embodiments of FIGS. 4, 8, and 9), or provide a three-phase voltage to a single unit power cell (exemplary embodiment of FIG. 6).

A phase shift angle of the secondary winding of the module-type phase shift transformer according to the present exemplary embodiment is determined by Equation 1 and Equation 2 above. Also, a phase shift angle of the primary winding of the module-type phase shift transformer according to the present exemplary embodiment is determined as follows.

$$\alpha_{prim} = \frac{360}{N_{m\_T}} \frac{1}{N_{sec\_out}} \frac{1}{N_{diode\_pulse}} \quad \text{[Equation 3]}$$

Here, Nm_T is the number of modules of the phase shift transformer, Nsec_out is the number of outputs of the secondary side of the single phase shift transformer module, and Ndiode_pulse is the number of pulses of a rectifying unit. For example, in the first exemplary embodiment of FIG. 4, Nm_T is 2, Nsec_out is 6, and Ndiode_pulse is 6, and thus, $\alpha_{prim}$ is 5 degrees. The primary winding of the phase shift transformer may be configured by shifting a phase in a manner of multiples of $\pm\alpha_{prim}$ ° based on 0 degree.

Capacity of the module-type phase shift transformer has the following relationship with capacity of the related art single unit-type phase shift transformer.

$$S_{m\_T} = \frac{S_{conv}}{N_{m\_T}} \quad \text{[Equation 4]}$$

Here, Sm_T is an apparent power per module of the module-type phase shift transformer according to the present exemplary embodiment, and Sconv is apparent power of the single unit type phase shift transformer.

Since the module-type phase shift transformer has small capacity, relative to the existing single unit type phase shift transformer, an area occupied by the transformer windings (winding window) is reduced, reducing an overall volume and weight, and since the volume and weight of a phase shift transformer are reduced, a size and volume of an overall system may be reduced.

Also, the module-type phase shift transformer according to the present exemplary embodiment has the transformer module by Nm_T, which resultantly provides a degree of freedom of design of the overall system, providing flexibility of design.

Also, in the existing single unit type phase shift transformer, when the primary winding has an error, the overall system cannot be operated. In contrast, in the case of using the module-type phase shift transformer according to the present exemplary embodiment, when a primary winding of one module has an error, a power conversion circuit connected to an erroneous module may be bypassed and an output may be reduced, and in this state, a continuous operation may be performed. Due to this structural features, in the case of using the module-type phase shift transformer according to the present exemplary embodiment, redundancy of the overall system may be increased. A current distortion may occur in an input terminal.

Hereinafter, an inverter unit of a unit power cell according to the present exemplary embodiment will be described.

As illustrated in FIGS. 5 and 7, a unit power cell according to the present exemplary embodiment includes a cascaded T-type NPC inverter unit. An operation of the inverter unit according to the present exemplary embodiment will be described with reference to FIG. 5.

One leg of an inverter unit 53 includes four switch units and an output pole voltage is defined according to operations of the first to fourth switch units 53a to 53d.

The first and third switch units 53a and 53c cannot be simultaneously turned on, and the second and fourth switch units 53b and 53d also cannot be simultaneously turned on. Also, as for operations of the first and second switch units 53a and 53b, in a case in which an output pole voltage, which is independently requested, is positive, the first and third switch units 53a and 53c are operated, and in a case in which the output pole voltage reference is negative, the second and fourth switch units 53b and 53d are operated.

In a case in which voltages of DC link capacitors C1 and C2 connected in series are defined as E, respectively, if an output pole voltage reference is positive, when the first switch unit 53a is turned on and the third switch unit 53c is turned off, the output pole voltage is 0.

When the output pole voltage defined in this manner is used, the output line-to-line voltage of each unit power cell has five levels of 2E, E, 0, −E, −2E.

FIGS. 10A through 10F are views illustrating conduction of power semiconductors according to directions of currents when output pole voltages are determined as E, 0, and −E.

Figure 10A:
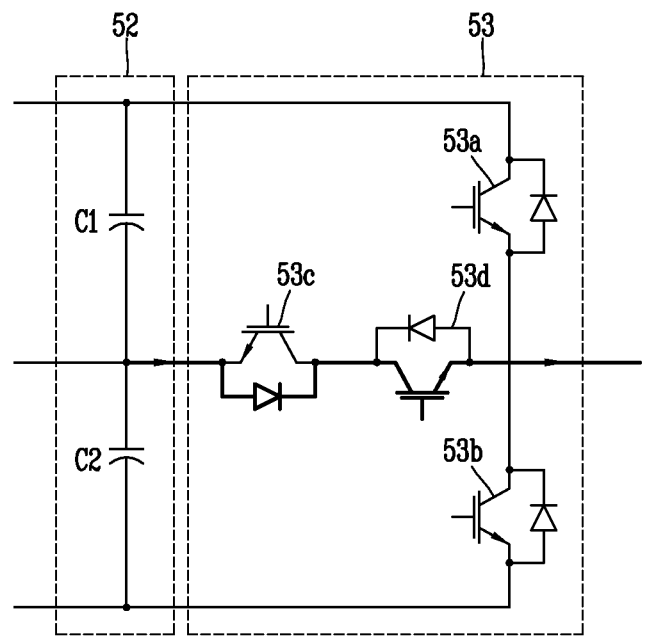
FIGS. 10A through 10F are views illustrating conduction of power semiconductors according to directions of currents when output pole voltages are determined as E, 0, and −E.
Figure 10B:
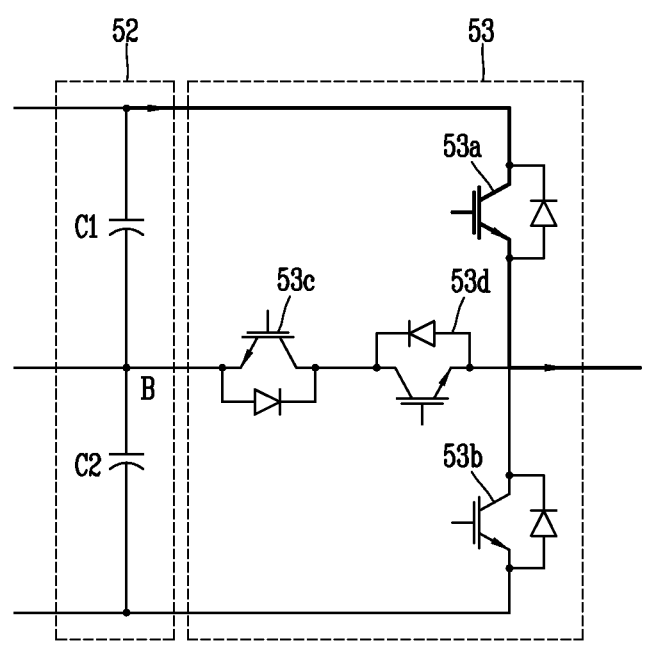
Figure 10C:
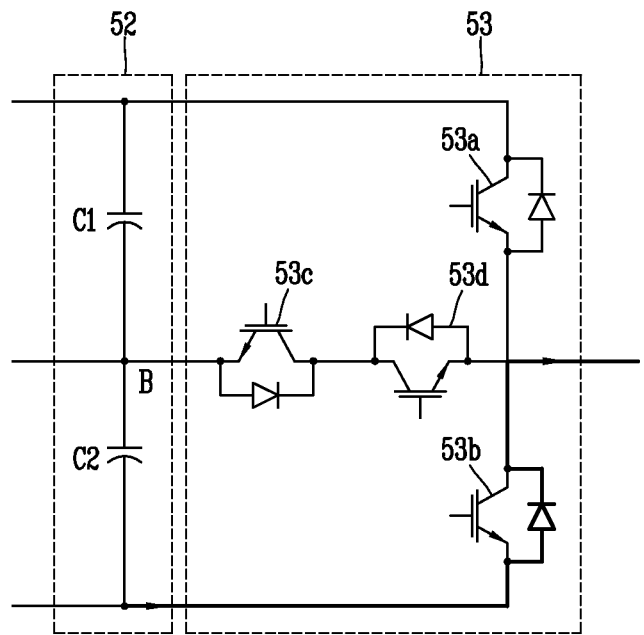

FIG. 10A illustrates a switch unit conducted when an output pole voltage is 0 and an output current is positive. FIG. 10B illustrates a switch unit conducted when an output pole voltage is E and an output current is positive. FIG. 10C illustrates a switch unit conducted when an output pole voltage is −E and an output current is positive.

In FIG. 10A, a diode of the third switch unit 53c and a power semiconductor of the fourth switch unit 53d are conducted. In FIG. 10B, a power semiconductor of the first switch unit 53a is conducted. Also, in FIG. 10C, a diode of the second switch unit 53b is conducted.

Figure 10D:
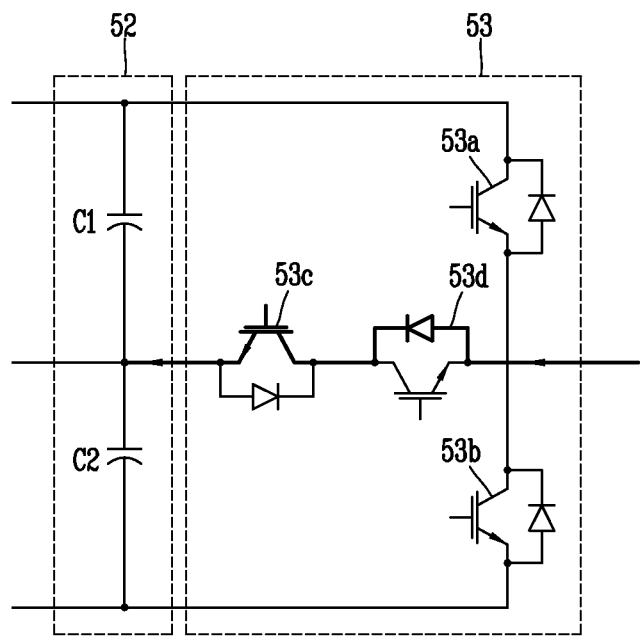
Figure 10E:
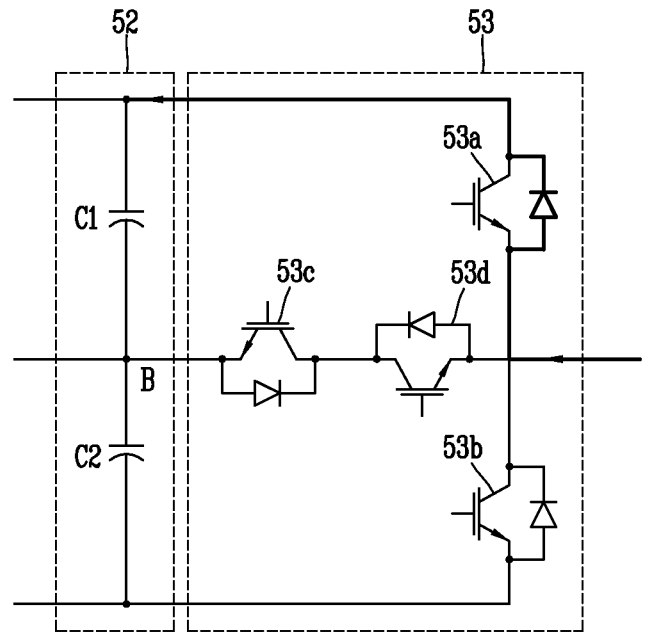
Figure 10F:
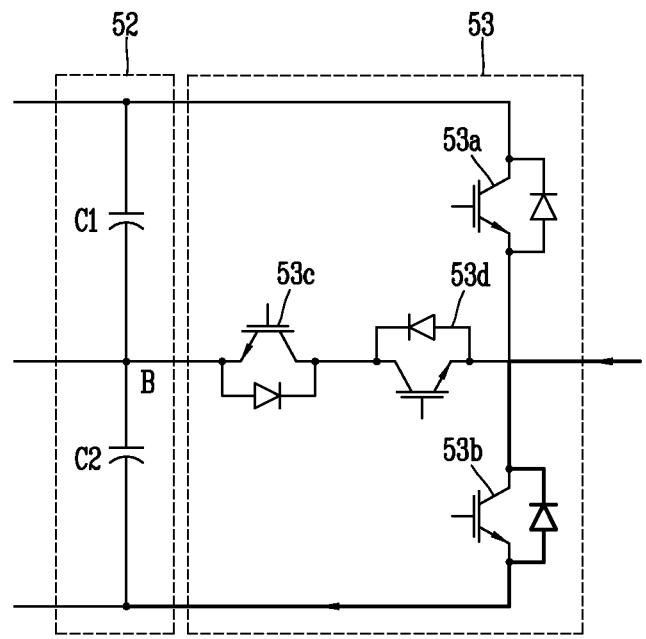

FIG. 10D illustrates a switch unit conducted when an output pole voltage is 0 and an output current is negative. FIG. 10E illustrates a switch unit conducted when an output pole voltage is E and an output current is negative. FIG. 10F illustrates a switch unit conducted when an output pole voltage is −E and an output current is negative.

In FIG. 10D, a power semiconductor of the third switch unit 53c and a diode of the fourth switch unit 53d are conducted. In FIG. 10E, a diode of the first switch unit 53a is conducted. In FIG. 10F, a power semiconductor of the second switch unit 53b is conducted.

Namely, according to the exemplary embodiment of the present disclosure, in the case of FIGS. 10A and 10D, the switch and the diode are conducted, but in other cases, only one element is conducted. Thus, when compared to the related art of FIGS. 3A through 3F, it can be seen that the number of conducted power semiconductor elements is reduced.

Thus, according to the exemplary embodiment of the present disclosure, since loss (heat) generated in the power semiconductor is reduced to increase efficiency of the overall system, and accordingly, since a size of the heat sink is reduced, a size of the system may be reduced.

According to the exemplary embodiment of the present disclosure, the structure of the phase shift transformer used in the input terminal of the multi-level medium-voltage inverter is modularized to increase a degree of freedom in designing a system, thereby reducing a volume and weight of the overall system, and accordingly, redundancy of the overall system may be increased.

Also, according to the exemplary embodiment of the present disclosure, since the inverter unit is configured to have the cascaded T-type NPC structure to reduce the number of conducted power semiconductors on average, conduction loss may be reduced, facilitating a design of heat dissipation, and thus, a volume and costs of the overall system may be reduced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A multi-level medium-voltage inverter that receives three-phase power and outputs a three-phase voltage to a three-phase motor, the multi-level medium-voltage inverter comprising:
    a plurality of unit power cells connected in series to output a single phase voltage, wherein each of the plurality of unit power cells outputs multi-level voltage outputs forming the single phase voltage; and
    a module-type phase shift transformer configured to convert the three-phase power and apply the converted power to three unit power cells constituting one level;
    wherein the module-type phase shift transformer includes a plurality of modules, and each of the plurality of unit power cells comprises:
        a rectifying unit configured to rectify an output received from the module-type phase shift transformer;
        a smoothing unit configured to smooth a DC voltage rectified by the rectifying unit; and
        an inverter unit comprising a plurality of switch units, each switch unit including a diode and a power semiconductor connected in parallel, wherein the plurality of switch units are configured in a cascaded T-type neutral point clamped (NPC) manner; and
    wherein, in the module-type phase shift transformer, a phase shift angle of a primary winding is determined using the number of the module-type phase shift transformers, the number of outputs of a secondary side of the module-type phase shift transformer, and the number of pulses of a rectifying unit of the unit power cell.

2. The multi-level medium-voltage inverter of claim 1, wherein the number of modules of the phase shift transformer corresponds to the number of multi-level voltage outputs or the number of unit power cells.

* * * * *